Sept. 2, 1941.  C. H. H. RODANET  2,255,004
PADDLE WHEEL
Filed Jan. 3, 1940  2 Sheets-Sheet 1
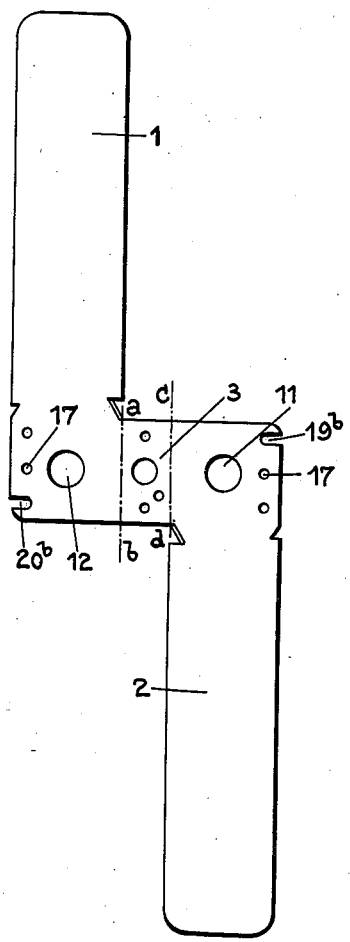
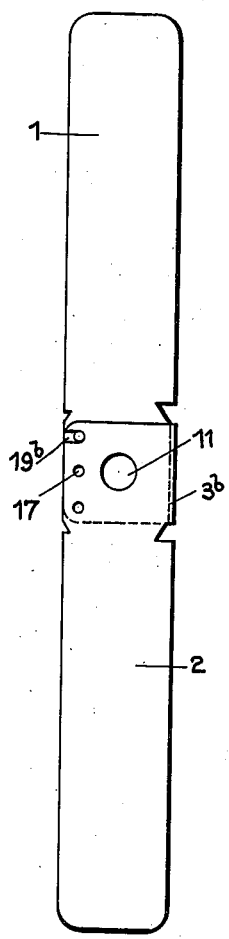
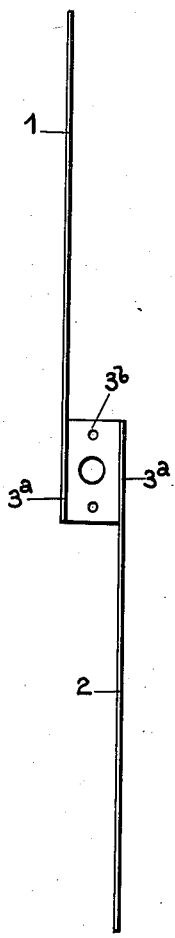
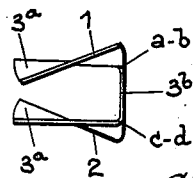
INVENTOR:
CHARLES HILAIRE
HENRI RODANET
BY Haseltine, Lake & Co.
ATTORNEYS Sept. 2, 1941.　　C. H. H. RODANET　　2,255,004
PADDLE WHEEL
Filed Jan. 3, 1940　　2 Sheets-Sheet 2
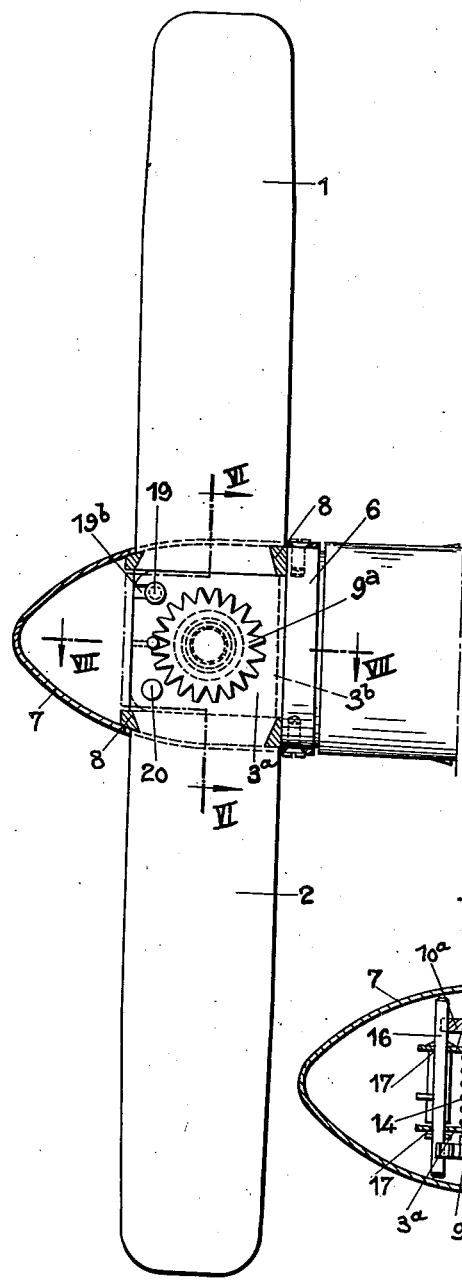
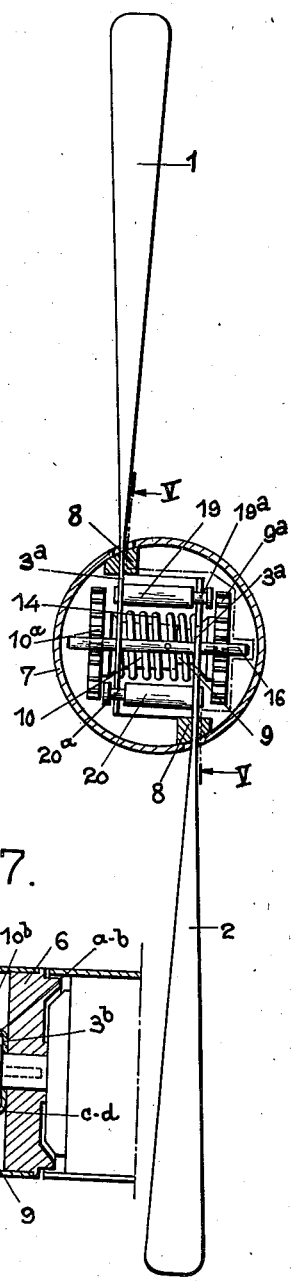
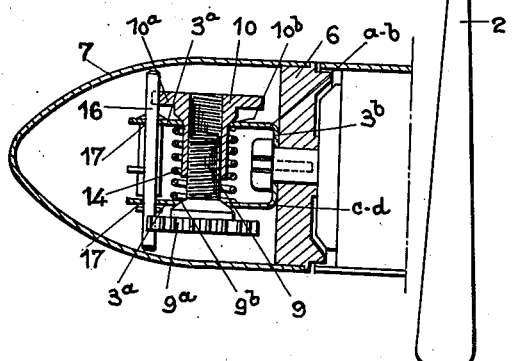
INVENTOR:
CHARLES HILAIRE HENRI RODANET
BY Haseltine, Lake & Co
ATTORNEYS Patented Sept. 2, 1941

2,255,004

UNITED STATES PATENT OFFICE 2,255,004

PADDLE WHEEL

Charles Hilaire Henri Rodanet, Neuilly-sur-Seine, France, assignor to Société Anonyme: Jaeger-Aviation, Levallois-Perret, Seine, France Application January 3, 1940, Serial No. 312,245
In France January 16, 1939

2 Claims. (Cl. 170—132)

The present invention has for object a paddle-wheel utilisable in a general manner, and more especially on a log and in particular an aerial log. This paddle-wheel is devised for allowing, not only a simple and economical construction, but also an adjustment of the pitch of the blades.

The invention consists, generally speaking, in constructing the paddle-wheel in such a manner that the two blades which constitute the same are each rigid with one of the branches of a U-shaped hub or the like, the bottom of which forms the part for securing it to the rotating shaft whereas the branches can be resiliently distorted inwardly or outwardly by bending each branch about its line of attachment to the bottom of the U-shaped hub, so as to allow at will of adjusting the pitch of the blades.

This general principle of construction and of adjustment, more particularly defined in the case of a paddle-wheel having two blades, is obviously applicable to a paddle-wheel comprising a single blade, three blades or a larger number of blades. In this case, one or more branches, the number of which is equal to that of the blades of the paddle-wheel, form projections on the bottom of attachment to the rotating shaft.

In practice, the blades and the hub are cut out in one and the same metal blank; the central part is folded in U shape and the blades which form lateral extensions of the opposite sides of the branches, are suitably curved.

In a form of construction, the branches of the U-shaped hub are urged, on the one hand, in the closing direction, by a system of the screw and nut type and, on the other hand, in the opening direction, by a spring or the like, both members of the screw and nut system each comprising a toothed head or flange combined with a stop or locking pin engaged in the fixed perforations of the branches of the U-shaped hub.

The invention also includes other particular points which will appear in the following text given with reference to the accompanying drawings, by way of example only, in which:

Fig. 1 shows the paddle-wheel cut out in a metal blank and before folding.

Fig. 2 is a side view of the paddle-wheel after folding.

Fig. 3 is a corresponding front view but before bending the blades.

Fig. 4 is a plan view of the paddle-wheel after folding and bending the blades.

Fig. 5 is a general elevation, on an enlarged scale, with section made according to the broken line V—V of Fig. 6 and showing the paddle-wheel mounted and provided with its device for adjusting the pitch of the blades.

Fig. 6 is a section made according to the broken line VI—VI of Fig. 5.

Fig. 7 is a section made according to line VII—VII of Fig. 5.

The log paddle-wheel, illustrated by way of example only, comprises two blades 1 and 2 which form one piece with a hub 3. The blades 1, 2 and the hub 3 are obtained by cutting out one and the same metal blank or plate as illustrated in Fig. 1, perforations and notches being also formed in the part 3. After folding the part 3 according to line $ab$ and $cd$, the hub 3 has a general U shape, the blades 1 and 2 constitute lateral and opposed extensions of the branches $3^a$ of the hub the bottom of which is indicated by the reference number $3^b$. The blades are then curved to the final shape, as shown in plan view in Fig. 4, so as to have a definite pitch.

Reference will now be made to Figs. 5 to 7 which illustrate the mounting of the paddle-wheel and its device for adjusting the pitch of the blades.

The bottom $3^b$ of the hub is secured on a rotating plate 6 from which extends the rotating shaft, not shown, and which drives the device controlling or indicating the speed of the paddle-wheel. On the plate 6 is also secured a hood 7 through which pass the blades 1 and 2, packings being provided at 8 at the passage of the blades through the hood 7.

A screw 9 and a nut 10, having toothed heads or flanges $9^a$ and $10^a$, are arranged as more particularly shown in Fig. 7. The screw 9 and the nut 10 have parts in the shape of a spherical ring $9^b$ and $10^b$ which take a bearing on the edges of the perforations 11 and 12 provided in the branches $3^a$ of the hub. A spring 14, surrounding the nut 10 and the screw 9, takes a bearing on the inner faces of the branches $3^a$ and tends to space said branches apart. On the contrary, by screwing the nut 10 and the screw 9, the branches $3^a$ can be brought nearer in antagonism to the action of the spring 14 and to the resiliency of the branches $3^a$.

The movement of the branches $3^a$ from or towards each other, which branches bend according to the lines $ab$ and $cd$ for folding and connecting said branches $3^a$ with the bottom $3^b$, allows of modifying the pitch of the blades 1 and 2. In fact, as said blades are rigid with the branches $3^a$ of the hub, they follow the adjustment of the position of said branches.

For holding the branches 3ª stationary after their adjustment, use is made of a pin 16 engaged in corresponding perforations 17 formed in said branches and which is inserted between the teeth of the heads 9ª and 10ª of the screw and of the nut so as to prevent these two members from rotating.

The extraction of the pin 16 ensures the unlocking of the screw and nut system in order to allow of effecting a further adjustment of the pitch of the blades, the pin being then again placed in position after adjustment.

In order to limit the inward and outward displacement of the branches 3ᵇ, a system of abutments is provided. This system comprises rods 19 and 20 rigidly mounted on the branches 3ª and which comprise parts 19ª and 20ª of smaller diameter, the ends of which form abutments and which are engaged in corresponding notches 19ᵇ and 20ᵇ formed in said branches.

The device, previously described, allows the pitch of the blades 1 and 2 to be accurately adjusted. Furthermore, the construction previously described is extremely simple and can be manufactured in mass production very economically.

It is obvious that the embodiment described and illustrated herein is given only by way of indication and not in a limiting sense. All modifications or changes which do not alter in any way the main features above set forth or the desired result, remain included in the scope of the present invention.

What I claim as my invention and desire to secure by Letters Patent is:

1. A paddle wheel particularly adapted for use on an aerial log, and having one or more blades, a rotatable shaft for said paddle wheel, a U-shaped hub rigid with said one or more blades having a bottom portion forming a part by which to secure said hub to the shaft, the branches or legs of said hub being capable of being distorted and bent about its line of attachment to the bottom portion of said hub in order to allow adjustment of the pitch of the blades, said hub and blades being formed from a unitary sheet of metal having the intermediate portion folded into a U-shaped hub while the blades form lateral extensions of the opposite sides of the branches or legs of said hub, means for urging said branches or legs toward each other tending to close the same including a screw and nut system, and means for urging the branches apart tending to open the same including a resilient means, the members of the screw and nut system each comprising a toothed head or flange combined with a stop or locking pin engaged therewith and fixed in perforations formed in the branches of the U-shaped hub.

2. A paddle wheel according to claim 1, including abutments limiting the degree to which the branches or legs of the hub may be spaced apart at maximum.

CHARLES HILAIRE HENRI RODANET.